United States Patent [19]
Nakaya

[11] Patent Number: 5,440,607
[45] Date of Patent: Aug. 8, 1995

[54] IMAGE RECORDING/REPRODUCING APPARATUS

[75] Inventor: Junko Nakaya, Ootawara, Japan

[73] Assignee: Kabushiki Kaisha Toshiba, Kawasaki, Japan

[21] Appl. No.: 143,056

[22] Filed: Oct. 29, 1993

[30] Foreign Application Priority Data

Oct. 30, 1992 [JP] Japan .................. 4-293253

[51] Int. Cl.$^6$ ............................................. G06F 15/64
[52] U.S. Cl. ................... 378/98.2; 378/98.5; 378/116
[58] Field of Search ............. 378/98.5, 98.2, 98, 378/114, 115, 116, 62, 190, 98.12

[56] References Cited

U.S. PATENT DOCUMENTS

| | | | |
|---|---|---|---|
| 4,658,413 | 4/1987 | Nishioka et al. | 378/116 X |
| 4,924,487 | 5/1990 | Nishiki | 378/116 X |
| 4,943,987 | 7/1990 | Asahina et al. | 378/98.5 |
| 5,023,896 | 6/1991 | Yokouchi et al. | 378/116 X |

*Primary Examiner*—David P. Porta
*Attorney, Agent, or Firm*—McClelland, Maier, & Neustadt

[57] ABSTRACT

An image recording/reproducing apparatus includes a recording/reproducing unit for recording a plurality of fluoroscopic images and a plurality of pickup images that are acquired by repeating, as time elapses, a fluoroscopic operation for continuously acquiring a plurality of fluoroscopic images and an imaging operation for acquiring at least one pickup image, a monitor for displaying the plurality of pickup images, a mouse for selecting a desired pickup image, a display controller for specifying a series of fluoroscopic images that are acquired immediately before or after the selected pickup image and are continuous along the time axis, and a monitor for displaying the series of fluoroscopic images reproduced by the recording/reproducing unit. The series of fluoroscopic images acquired immediately before or after the selected pickup image are specified and displayed.

10 Claims, 5 Drawing Sheets

| ID NUMBER OF PATIENT | X-RAY RADIATION START TIME POINT | X-RAY RADIATION END TIME POINT | FRAME NUMBER IMMEDIATELY AFTER RADIATIONS IS STARTED | FRAME NUMBER IMMEDIATELY BEFORE RADIATION IS ENDED | SELECTION |
|---|---|---|---|---|---|
| 1234 | 14:00 | 14:12 | 1200 | 1360 | FLUOROSCOPY |
| 1234 | 14:13 | 14:13 | 1361 | 1361 | IMAGING |
| 1234 | 14:14 | 14:14 | 1362 | 1902 | FLUOROSCOPY |
| | | | | | |

CLASSIFICATION INFORMATION DATA

| CLASSIFI-CATION | DB CLASSIFI-CATION | TYPE |
|---|---|---|
| PATIENT | PATIENT INFORMATION | PATIENT A, PATIENT B |
| INSPECTION | INSPECTION | UPPER DIGESTIVE TRACT, LARGE INTESTINE |
| IMAGE | IMAGE | INDEX, FLUOROSCOPY |
| ⋮ | ⋮ | ⋮ |

CLASSIFICATION IMAGE DATA

| TYPE OF IMAGE | INFORMATION |
|---|---|
| IMAGING | |
| FLUOROSCOPY | |
| INDEX | INDEX IMAGE INFORMATION |

INDEX IMAGE DATA

| NUMBER | ID NUMBER OF PATIENT | CLASSIFICATION OF INSPECTION | REFERENCE FLAG | STORING ADDRESS |
|---|---|---|---|---|
| 101 | | UPPER DIGESTIVE TRACK | 1 | ----- |
| 102 | | UPPER DIGESTIVE TRACK | 1 | ----- |
| 103 | | BLOOD VESSEL | 0 | ----- |
| 104 | | BLOOD VESSEL | 0 | ----- |
| 105 | | LOWER DIGESTIVE TRACK | 0 | ----- |
| 106 | | LOWER DIGESTIVE TRACK | 1 | ----- |
| 107 | | UPPER DIGESTIVE TRACK | 0 | ----- |
| 108 | | ERCP | 1 | ----- |

FIG. 8

IMAGE RECORDING/REPRODUCING APPARATUS

BACKGROUND OF THE INVENTION

1. Field of the Invention

The present invention relates to an image recording/reproducing apparatus for recording/reproducing an image obtained by an X-ray diagnostic unit that repeats fluoroscopy and imaging.

2. Description of the Related Art

In fluoroscopy, an X-ray having a comparatively low energy is continuously radiated on a body to be inspected in order to obtain a motion image. An X-ray pulse having a comparatively high energy is radiated on the body to be inspected at an imaging position and a timing which are confirmed from a fluoroscopic image, thereby performing imaging.

Conventionally, a fluoroscopic image is used only for obtaining an imaging position and a timing. However, CCD cameras having a high pixel density and a high sensitivity have been recently introduced, and utilization of the fluoroscopic image is enhanced. Currently, the fluoroscopic image is increasingly used for the purpose of diagnosis in the same manner as a pickup image. The fluoroscopic image is positively utilized in angiography that uses a contrast medium.

When fluoroscopic images are recorded on a video tape, a desired shot (one shot is constituted by a plurality of fluoroscopic images) is retrieved in accordance with the various functions, e.g., rewinding, fast-forwarding, and high-speed reproduction, of the video tape.

This retrieval requires a very long period of time and a cumbersome operation.

SUMMARY OF THE INVENTION

It is an object of the present invention to provide an image recording/reproducing apparatus that can retrieve a desired fluoroscopic image with a simple operation within a short period of time.

According to the present invention, there is provided an image recording/reproducing apparatus comprising means for recording a plurality of fluoroscopic images and a plurality of pickup images that are acquired by repeating, as time elapses, a fluoroscopic operation for continuously acquiring a plurality of fluoroscopic images and an imaging operation for acquiring at least one pickup image, means for displaying the plurality of pickup images, means for selecting a desired pickup image, means for specifying a series of fluoroscopic images that are acquired immediately before or after the selected pickup image and are continuous along the time axis, and means for displaying the series of fluoroscopic images read from the recording means. Hence, a desired series of fluoroscopic images can be easily specified only by selecting a pickup image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The preferred embodiments of the present invention will be described with reference to the accompanying drawings.

Figure 1:
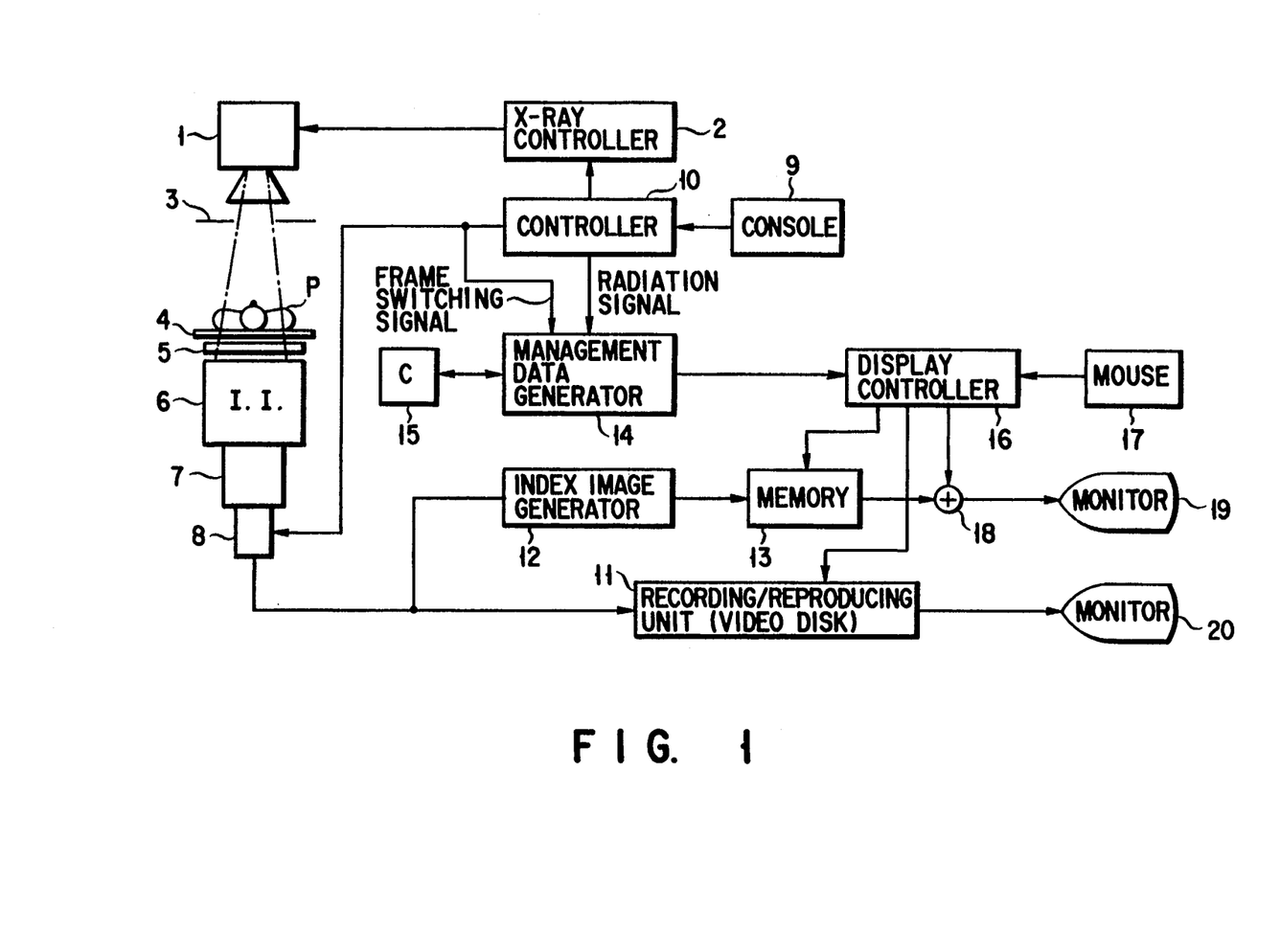
FIG. 1 is a block diagram of the first embodiment of the present invention.

FIG. 1 shows the arrangement of an image recording/reproducing apparatus according to the first embodiment of the present invention. In this embodiment, the present invention is applied to the X-ray diagnosing unit of the image recording/reproducing apparatus.

An X-ray tube 1 radiates an X-ray upon reception of a tube voltage from an X-ray controller 2. The X-ray reaches a body P to be inspected on a top plate 4 through a slit 3. The X-ray passing through the body P to be inspected reaches a film held by a spot shot unit 5. The X-ray passing through the film is converted to light by an image intensifier (I.I.) 6. This light forms an image on an imaging stage of a TV camera 8, e.g., a CCD camera, through an optical system 7, and is imaged by the TV camera 8.

In addition to switches for inputting inspection conditions, e.g., a tube voltage for fluoroscopy, a tube voltage for imaging, the name of the patient, and the ID number of the patient, a console 9 has switches with which the operator designates various operations, (i.e., the start of fluoroscopy, the end of fluoroscopy, and imaging). During a time period after the start of fluoroscopy and before the end of fluoroscopy (or before imaging is designated), a radiation signal is continuously supplied from a controller 10 to the X-ray controller 2 together with a signal indicating the tube voltage level for fluoroscopy which is set by the operation of the console 9. Usually, the tube voltage for fluoroscopy is set to be lower than that for imaging. The X-ray controller 2 continuously supplies the tube voltage to the X-ray tube 1 while it receives the radiation signal. Then, the X-ray tube 1 continuously radiates an X-ray having a comparatively low energy. During this period of time, the controller 10 repeatedly supplies a frame switching signal (vertical sync signal) indicating a switching timing of a one-frame imaging operation to the TV camera 8. Then, a plurality of images are sequentially picked up by the TV camera 8. The respective images picked up by the TV camera 8 during the fluoroscopic period will be referred to as fluoroscopic images hereinafter.

When imaging is designated, a radiation pulse signal is supplied from the controller 10 to the X-ray controller 2 together with a signal indicating a tube voltage level for imaging which is set by the operation of the console 9. The X-ray controller 2 supplies a comparatively high pulse tube voltage to the X-ray tube 1. Then, the X-ray tube 1 radiates an X-ray having a comparatively high energy for a very short period of time. In synchronism with this radiation timing, the controller 10 supplies one frame switching signal to the TV camera 8. Then, one image is picked up by the TV camera 8. This image will be referred to as a pickup image hereinafter. When command for imaging is repeatedly input a plurality of times, the imaging operation is repeated the number of times equal to the number of times of the imaging command, as a matter of course.

The ID number of the patient input from the console 9 is sent to a management data generator 14 through the controller 10. The radiation signal sent from the controller 10 to the X-ray controller 2 is also sent to the management data generator 14 together with a signal indicating a selection of fluoroscopy or imaging. The management data generator 14 is connected to a clock circuit (C) 15 counting the current time. The management data generator 14 reads a time point (radiation start time point) when the radiation signal is input and a time point (radiation end time point) when the radiation signal is stopped from the clock circuit 15. Furthermore, the frame switching signal sent from the controller 10 to the TV camera 8 is also sent to the management data generator 14. Every time the management data generator 14 receives a frame switching signal, it increments the frame number held in it for the purpose of image management.

Using these pieces of information, the management data generator 14 generates management data in units of radiation signals. The management data consists of respective items of the ID number of the patient, radiation start time point, radiation end time point, frame number immediately after radiation is started, frame number immediately before radiation is ended, and selection of fluoroscopy or imaging. The management data is sequentially stored in the internal memory of a display controller 16.

The fluoroscopic image and the pickup image are sent to a recording/reproducing unit 11 using, e.g., a random-access video disk as a recording medium, and recorded in it. The pickup image is also sent to an index image generator 12 that generates an index image. An index image is an image in which a plurality of pickup images each reduced by, e.g., a 1/16 time in the area ratio are contained in one frame. The index image is stored in a memory 13.

During reproduction, the index image is read from the memory 13 in accordance with the command of a display controller 16 and displayed on a monitor 19 through an adder 18. The adder 18 synthesizes the image of a cursor with the index image. A cursor signal indicating the cursor image is sent from the display controller 16 to the adder 18. The cursor moves on the index image in an interlocked manner with the movement of a pointing device, e.g., a mouse or a digitizer connected to the display controller 16. In this embodiment, a mouse 17 is used as the pointing device.

Upon operation of the mouse 17, the cursor is moved onto a pickup image within the index image desired by the operator. At this time, the desired pickup image is specified by the display controller 16 in accordance with the button operation of the mouse 17. By using the management data, the display controller 16 specifies the frame numbers of a series of fluoroscopic images, that are picked up immediately before the specified pickup image, based on the relationship of the order with respect to the frame number of the specified pickup image or the relationship of the order with respect to the X-ray radiation start time point of the specified pickup image. The display controller 16 sequentially supplies the respective frame numbers of the series of specified fluoroscopic images to the recording/reproducing unit 11 together with a reproduction command. The recording/reproducing unit 11 reproduces the fluoroscopic images specified by the frame numbers. Then, the series of fluoroscopic images are sequentially displayed on a monitor 20 in accordance with their imaging order. Therefore, the movement of the tissues and the flow of the contrast medium during the fluoroscopic period are reproduced on the monitor 20 as a motion image. Note that the display controller 16 preferably repeatedly supplies the respective frame numbers to the recording/reproducing unit 11 until the operator inputs an end command. Then, the series of fluoroscopic images are repeatedly reproduced, so that the operator does not need to input the command for reproducing the same series of fluoroscopic images over and over again.

Figure 2:
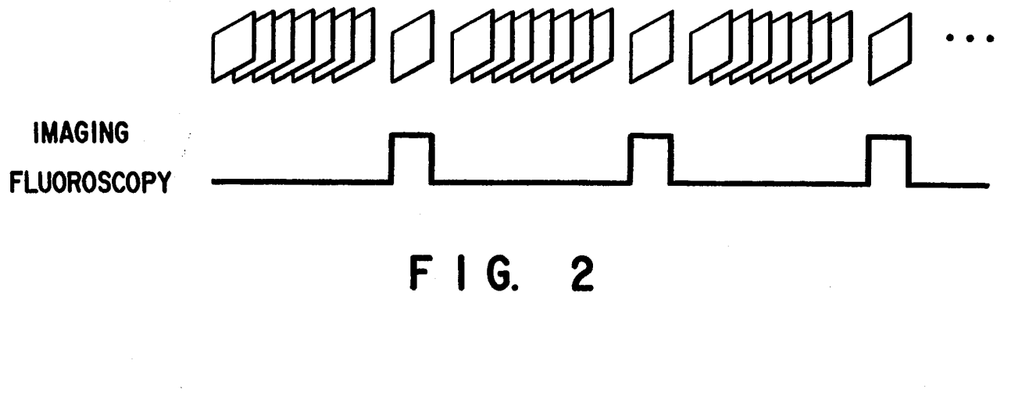
FIG. 2 is a diagram showing the flow of a series of inspection operations.

The operation of this embodiment will be described. FIG. 2 shows the repetition of fluoroscopy and imaging with the lapse of time.

Prior to the start of inspection, inspection conditions, e.g., the tube voltage for fluoroscopy, the tube voltage for imaging, the name of the patient, and the ID number of the patient are input from the console 9. For example, after the contrast medium is injected into the body to be inspected, a fluoroscopy start (inspection start) command is input from the console 9 at an arbitrary time. Upon reception of this command, the controller 10 outputs a radiation signal to the X-ray controller 2 together with a signal indicating the tube voltage level for fluoroscopy. This radiation signal is continuously supplied to the X-ray controller 2 until a fluoroscopy end command (or an imaging command) is input. The X-ray controller 2 continuously applies a tube voltage to the X-ray tube 1 while it receives the radiation signal. Hence, the X-ray tube 1 continuously radiates an X-ray having a comparatively low energy. During this period of time, the controller 10 repeatedly supplies a frame switching signal to the TV camera 8. Upon reception of the frame switching signal, a plurality of fluoroscopic images are sequentially picked up by the TV camera 8. The fluoroscopic images are sent to the recording/reproducing unit 11 and sequentially recorded on the video disk. The fluoroscopic images are also sequentially displayed on the monitor 20.

The operator inputs an imaging command at a good timing when the contrast medium is sufficiently spread in the target portion. This ends the fluoroscopic operation and the imaging operation is executed. When the imaging command is input, the controller 10 supplies a pulsed radiation signal to the X-ray controller 2 together with a signal indicating the tube voltage level for imaging. The X-ray controller 2 supplies a comparatively high tube voltage to the X-ray tube 1 in a pulsed manner. Thus, the X-ray tube 1 radiates an X-ray having a comparatively high energy during a very short period of time. In synchronism with this radiation timing, the controller 10 supplies one frame switching signal to the TV camera 8. Then, one pickup image is obtained by the TV camera 8. This pickup image is sent to the index image generator 12. After imaging is ended, the fluoroscopic operation is immediately restored unless an inspection end command is input. In this manner, fluoroscopy and imaging are repeated until an inspection end command is input. During imaging, a film is set immediately under the body P to be inspected by the spot shot unit 5. Thus, an X-ray image transmitted through the body p to be inspected is formed on the film with a high contrast and a high resolution.

Figure 3:
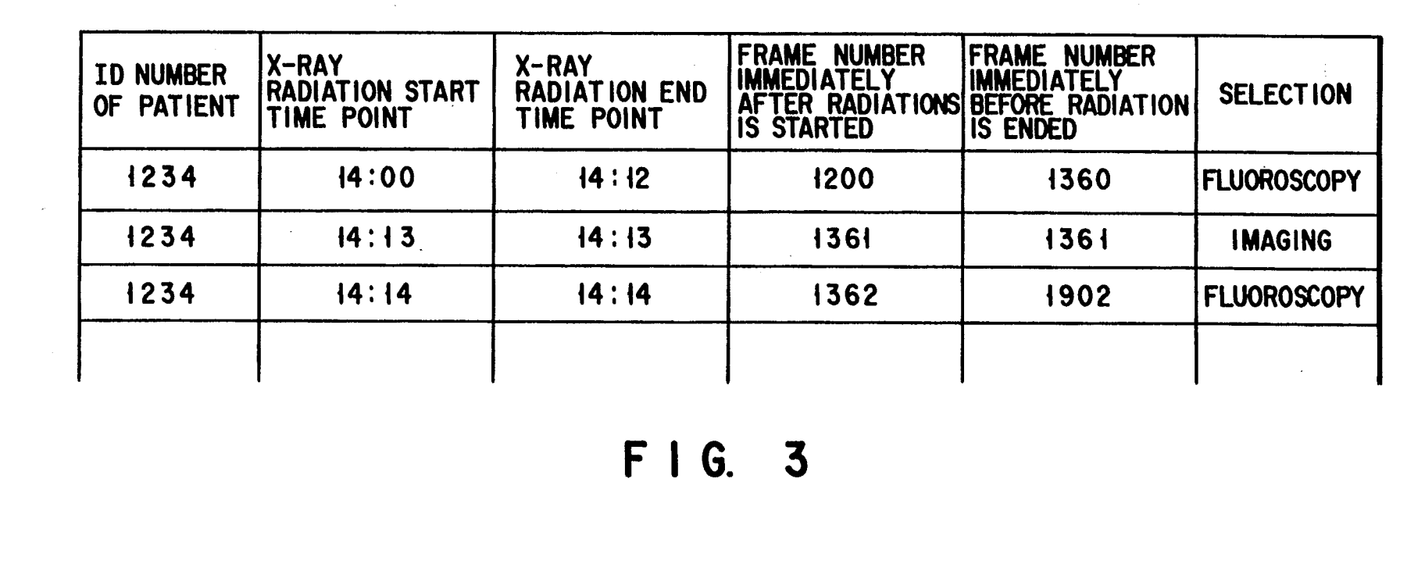
FIG. 3 is a table showing examples of management data generated by a management data generator shown in FIG. 1.

While fluoroscopy and imaging are repeated in this manner, the management data generator 14 consecutively generates management data. As described above, the radiation signal is supplied from the controller 10 to the management data generator 14 together with the signal indicating a selection of fluoroscopy or imaging. The management data generator 14 reads a time point (radiation start time point) when the radiation signal is input and a time point (radiation end time point) when the radiation signal is stopped from the clock circuit 15. The frame switching signal is supplied from the controller 10 to the management data generator 14. Also, every time it receives a frame switching signal, the management data generator 14 increments the frame number held in it for the purpose of image management. The management data generator 14 generates management data in units of radiation signals as it picks up the frame number immediately after the radiation signal is input and the frame number immediately before the radiation signal is stopped. The management data is sequentially stored in the internal memory of the display controller 16, as shown in FIG. 3.

Figure 4:
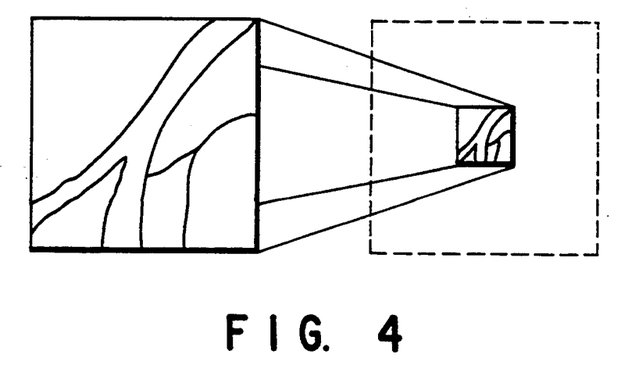
FIG. 4 is a diagram showing a reducing process of a pickup image performed by an index image generator shown in FIG. 1.
Figure 5:
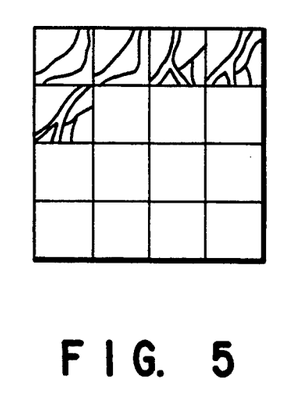
FIG. 5 is a table showing an example of an index image.

The pickup images are reduced by a 1/16 time by the index image generator 12, as shown in FIG. 4, and sequentially arranged in one frame in accordance with the imaging order. Hence, an index image as shown in FIG. 5 in which a plurality of reduced pickup images are collected is generated. This index image is stored in the memory 13.

During reproduction (image reading), the index image is read from the memory 13 in response to the command from the display controller 16. A cursor image is synthesized with the index image by the adder 18. The resultant index image is displayed on the monitor 19.

Figure 6:
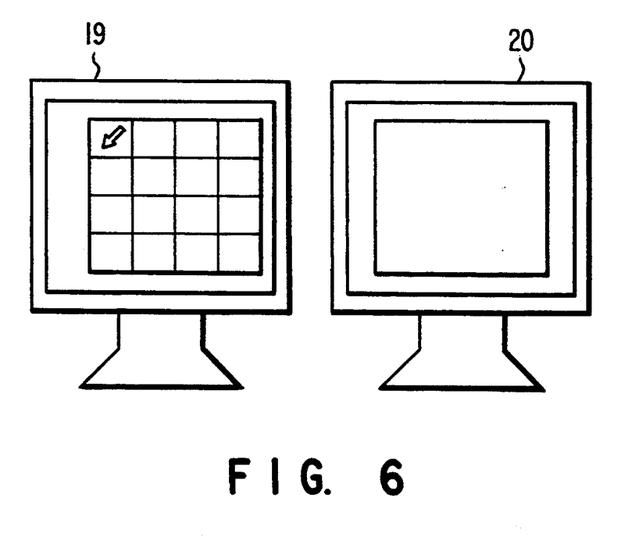
FIG. 6 is a view showing display examples of two monitors.

As shown in FIG. 6, the cursor is moved to a pickup image within the index image desired by the operator when the operator operates the mouse 17. At this time, the desired pickup image is specified by the button operation of the mouse 17. For example, a pickup image of frame number 1361 of FIG. 3 is specified.

The display controller 16 specifies frame numbers 1200 to 1360 of the series of fluoroscopic images that are picked up immediately before the specified pickup image in accordance with the relationship of the order with respect to the time point of the management data or the relationship of the order with respect to the frame number. The respective frame numbers are sequentially supplied to the recording/reproducing unit 11 at a constant interval which is the same as the time interval of the frame switching signals for imaging. The fluoroscopic images specified by the respective frame numbers are reproduced by the recording/reproducing unit 11 and sequentially displayed on the monitor 20.

Therefore, the movement of the tissues and the flow of the contrast medium during the fluoroscopic period are reproduced on the monitor 20 as a real-time motion image. Note that the display controller 16 preferably repeatedly supplies the respective frame numbers to the recording/reproducing unit 11 until the operator inputs an end command. Then, the series of fluoroscopic images are repeatedly reproduced, so that the operator need not input the command for reproducing the same series of fluoroscopic images over and over again. Hence, the operator can concentrate on image reading, leading to an improvement in diagnosing performance.

As described, according to this embodiment, when a desired pickup image is designated, the series of fluoroscopic images picked up immediately before this pickup image can be specified. More specifically, when the pickup image is used as key information for retrieving a desired fluoroscopic image, a conventional cumbersome and complicated retrieval operation can be eliminated. Therefore, the image reading operation can be efficiently performed without being interfered with by the retrieval operation. In this embodiment, when the interval of the respective frame numbers supplied from the display controller 16 to the recording/reproducing unit 11 is adjusted, the images can be displayed at an arbitrary reproducing speed, e.g., frame reproduction, slow reproduction, and fast-forwarding. In the above explanation, an index image is generated in order to select a pickup image and is displayed. However, the method of selecting the pickup image is not limited to this, but other methods can be employed, e.g., a method of displaying a plurality of pickup images one by one on the entire surface of the monitor in a page-turning manner and inputting a specifying command when a desired pickup image is displayed. Furthermore, in the above explanation, the series of fluoroscopic images picked up immediately before the designated pickup image are specified as the display target. However, a series of fluoroscopic images picked up immediately after the designated pickup image may be specified as the display target. The decision as to whether to specify the series of fluoroscopic images picked up immediately before or after the designated pickup image may be left to the operator.

The second embodiment of the present invention will be described.

In the second embodiment, the image recording/reproducing unit according to the first embodiment is set to cooperate with the existing PACS (Picture Archiving Communication System for medical application). The PACS stores a variety of types of image information in large quantities. When the cooperation with the PACS is obtained, the past pickup images and fluoroscopic images concerning the body to be inspected which is currently being subjected to image reading can be easily utilized as the reference material for image reading.

Figure 7:
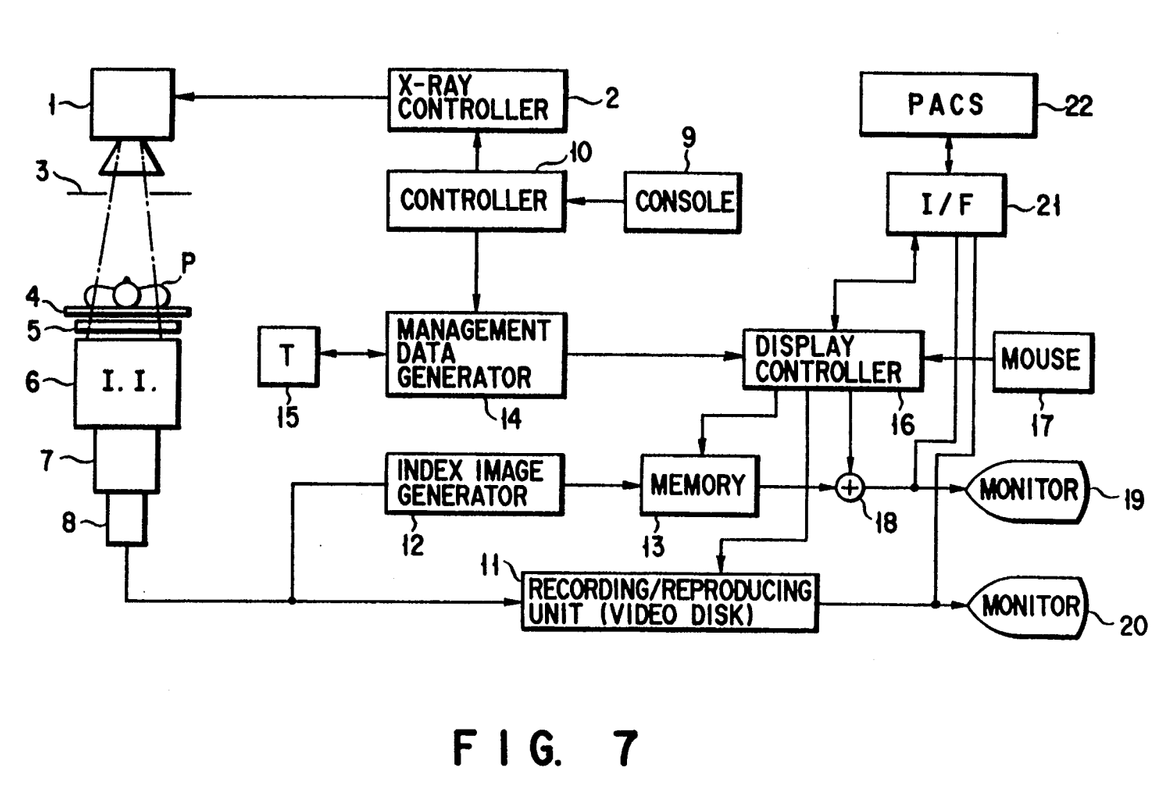
FIG. 7 is a block diagram of the second embodiment of the present invention.

FIG. 7 shows a block diagram of the second embodiment. The same portions as in FIG. 1 are denoted by the same reference numerals in FIG. 7 and a detailed description thereof will be omitted.

A PACS 22 is connected to a display controller 16 and monitors 19 and 20 through an interface (I/F) 21. The PACS 22 consists of a database section for storing a variety of types of images in large quantities that are acquired over the many past years in accordance with various modalities and the attribute information of the respective images, and a database management section for managing the large number of these images by using retrieval data.

Figure 8:
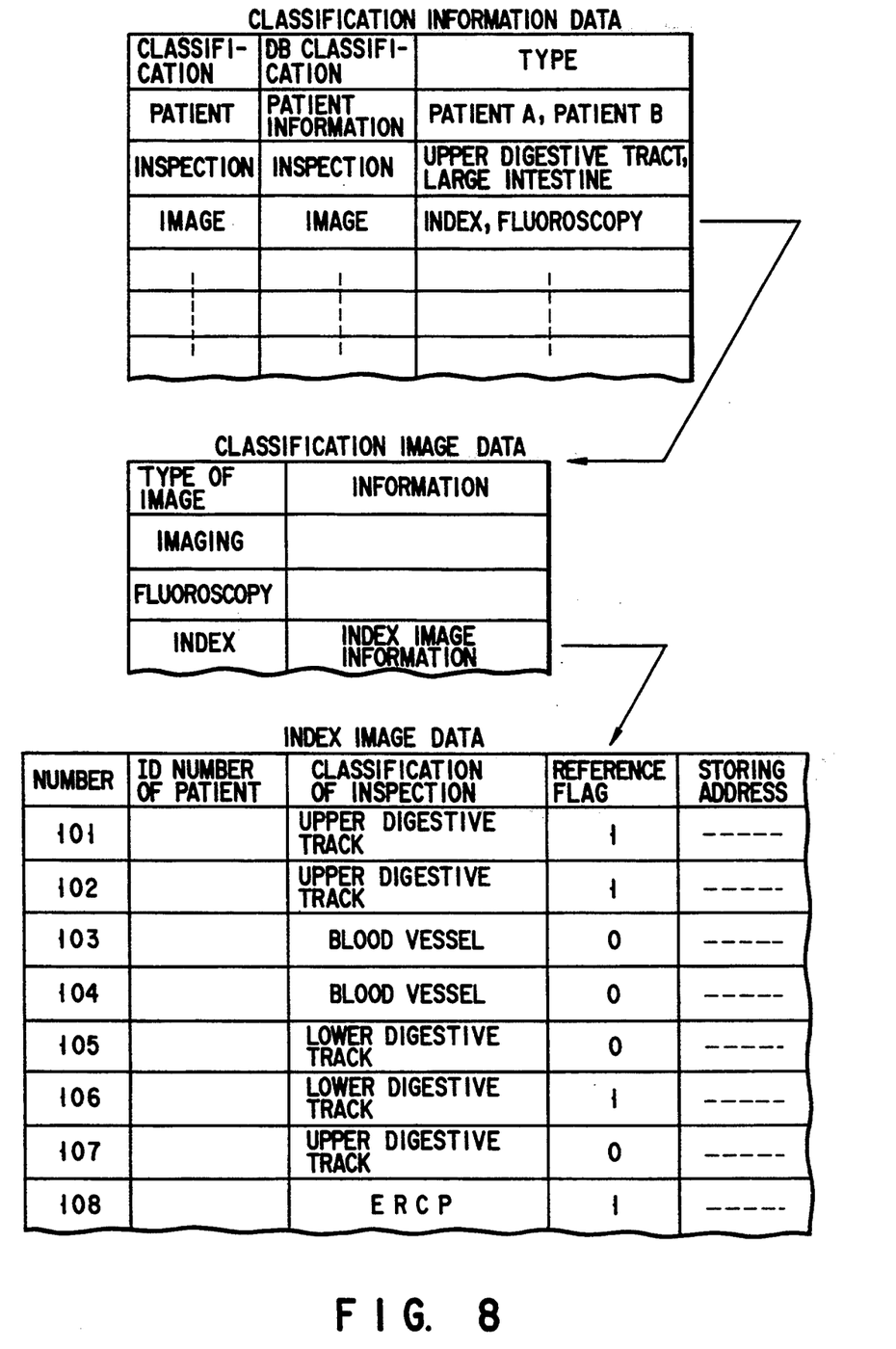
FIG. 8 shows tables representing examples of retrieval data held by a database management section of a PACS shown in FIG. 7.

FIG. 8 shows the typical structure of the retrieval data used by the PACS 22. Typical retrieval data has a hierarchical structure. Classified information data indicating the classification of information, e.g., patient information, inspection information, and image information is located at the highest level. Classified image data indicating the classification of image, e.g., the pickup image, the fluoroscopic image, and the index image is located immediately under each item of image information concerning this embodiment. Image data, consisting of simple attribute data (the ID number of the patient and the classification of inspection) of all the images stored in the database section and the addresses where the respective images are stored, is located immediately under each item of the pickup image, the fluoroscopic image, and the index image. In this case, only index image data located immediately under the item of the index image is shown. However, it must be noted that the image data of each of the pickup image and the fluoroscopic image includes the same items as that of the index image data. A reference flag is a parameter indicating the significance of each inspection, and is set before inspection or immediately after inspection is ended in accordance with the judgment of the operator.

The operation of this embodiment will be described.

When the operator wishes to refer to the past fluoroscopic image during image reading, a retrieval request is output from the display controller 16 to the database management section of the PACS 22. Retrieval data is sent from the PACS 22 to the display controller 16 in response to this retrieval request. The classified information data at the highest position of this retrieval data is entirely displayed on the monitor 19. The item of classified images is selected by operating a mouse 17. Then, the classified image data immediately under the item of classified images is entirely displayed. The item of index image is selected by operating the mouse 17. Then, the index image data immediately under the item of index image is entirely displayed. The operator selects a desired index image from this index image data by operating, e.g., the mouse 17. This index image read request is output from the display controller 16 to the database management section of the PACS 22. In response to this read request, the corresponding index image is output from the PACS 22 and displayed on the monitor 19. When the index image is displayed, an arbitrary pickup image is designated in the same manner as in the first embodiment. A read request for the series of fluoroscopic images that are picked up immediately before this pickup image is output from the display controller 16 to the database management section of the PACS 22. In response to this read request, the corresponding series of fluoroscopic images are output from the PACS 22 and displayed on the monitor 19 as motion images.

Regarding retrieval of an arbitrary pickup image from the PACS 22, when the item of pickup image is selected from the classified image data, the pickup image data immediately under this item is displayed. Therefore, the arbitrary pickup image can be easily retrieved by selecting the item of the desired pickup image from this pickup image data.

As described above, according to the second embodiment, the existing PACS 22 can be effectively utilized, in addition to the effect obtained by the first embodiment. Then, the past fluoroscopic images and pickup images of the same body to be inspected can be utilized as the reference for image reading. When the retrieval data is stored in the internal memory of the display controller 16 or in the video disk of a recording/reproducing unit 11, a time required for transmitting data between the PACS 22 and the display controller 16 can be eliminated, thereby shortening the retrieval time of the desired image. If the past pickup images and fluoroscopic images are stored in the video disk of the recording/reproducing unit 11, even if in a small amount as compared to that stored in the PACS 22, the transmission time of a very large number of images can be shortened.

The present invention is not limited to the embodiments described above, and can be modified in various manners. For example, in the above description, the pickup image is held by the film. However, if the pickup image is recorded on the video disk of the recording/reproducing unit 11, in the same manner as the fluoroscopic image, the pickup image can be entirely displayed on the monitor 20.

In this manner, according to the present invention, since the pickup image is utilized as the key information for retrieval, a series of desired fluoroscopic images can be retrieved by a simple operation within a short period of time. This easy retrieval and the high resolution and sensitivity of the recent TV camera lead to widening of the application range of the fluoroscopic image. Conventionally, when an imaging timing is erroneously shifted, re-imaging is requested. However, according to the present invention, a small error in imaging timing can be compensated for by the fluoroscopic image, thus decreasing the radiation exposure to a patient.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image recording/reproducing apparatus comprising:

storing means for storing a plurality of X-ray images which are repeatedly picked-up along a time base, such that frame numbers are serially given to the X-ray images in the order of the X-ray images being picked-up;

first displaying means, connected to said storing means, for extracting an m-number of X-ray images, whose frame numbers are discrete, from the X-ray images, and visually displaying the extracted X-ray images as images for use in retrieval;

designating means for designation by the operator of specific X-ray image designated by a frame number n from among the displayed X-ray images; and second displaying means, connected to said storing means, for dynamically visually displaying a series of X-ray images following the X-ray image having frame number n+1.

2. An apparatus according to claim 1, in which said first displaying means reduces a matrix size of each of said m-number of X-ray images into one frame, and then displays said one frame.

3. An apparatus according to claim 2, in which said first displaying means reduces a matrix size of each of said m-number of X-ray images to $1/m^2$.

4. An apparatus according to claim 2, in which said designating means is a pointing device for designating a position on a display screen of said first display means.

5. An image recording/reproducing apparatus according to claim 1, in which said storing means includes first storing means for storing said plurality of X-ray images and second storing means for storing said m-number of X-ray images.

6. An image recording/reproducing apparatus according to claim 5, in which said first storing means is a video disk system, and said second storing means is a random access memory device.

7. An apparatus according to claim 1, in which said recording means has a random-access recording medium.

8. An apparatus according to claim 7, in which said recording medium is a video disk.

9. An image recording/reproducing apparatus for an X-ray machine, comprising:
 an X-ray controller for varying the intensity values of X-rays emitted from the X-ray machine;
 a T.V. camera for receiving images produced by the X-ray machine;
 an index image generator for obtaining the images from the T.V. camera;
 a management data generator for obtaining patient information, image time information, frame numbers for different frames of the images, and intensity of the X-rays;
 storing means for storing the images; and
 a controller for causing said X-ray controller to activate the X-ray machine and transmit fluoroscopy range X-rays to obtain images from the T.V. camera showing an amount of fluoroscopic material in an area to be X-rayed, for causing said X-ray controller to activate the X-ray machine and emit radiographic range X-rays during imaging when an amount of the fluoroscopic material is sufficiently dispersed in the area to be X-rayed, for causing the T.V. camera to turn on and off and generating said frames of the images, and for combining information obtained by the management data generator with each of the corresponding frames generated into memory.

10. The apparatus according to claim 9, further comprising:
 a console for manually designating when the fluoroscopy ends and when imaging begins and for manually selecting frames to be reviewed; and
 display means for displaying selected frames.

* * * * *